US008366141B2

(12) United States Patent
Crisp

(10) Patent No.: US 8,366,141 B2
(45) Date of Patent: Feb. 5, 2013

(54) TRANSPORTER

(75) Inventor: David J. Crisp, London (GB)

(73) Assignee: Micralite Limited, Kent (GB)

( * ) Notice: Subject to any disclaimer, the term of this patent is extended or adjusted under 35 U.S.C. 154(b) by 873 days.

(21) Appl. No.: 12/091,425

(22) PCT Filed: Oct. 24, 2006

(86) PCT No.: PCT/GB2006/050349
§ 371 (c)(1),
(2), (4) Date: Aug. 28, 2008

(87) PCT Pub. No.: WO2007/049071
PCT Pub. Date: May 3, 2007

(65) Prior Publication Data
US 2008/0315563 A1  Dec. 25, 2008

(30) Foreign Application Priority Data

Oct. 26, 2005  (GB) .................................... 0521832.6
Jun. 12, 2006  (GB) .................................... 0611466.4

(51) Int. Cl.
*B62B 7/00* (2006.01)
(52) U.S. Cl. ..................................... 280/658; 280/47.38
(58) Field of Classification Search .................. 280/30, 280/47.38, 64, 400, 401, 415.1, 638, 642, 280/643, 647, 648, 650, 657, 658
See application file for complete search history.

(56) References Cited

U.S. PATENT DOCUMENTS

| | | | | |
|---|---|---|---|---|
| 2,989,318 A * | 6/1961 | Schenkman | .................. | 280/643 |
| 3,901,527 A * | 8/1975 | Danziger et al. | .............. | 280/638 |
| 4,386,790 A * | 6/1983 | Kassai | .......................... | 280/650 |
| 4,542,915 A * | 9/1985 | Wheeler et al. | ............... | 280/642 |
| 4,657,269 A * | 4/1987 | Elvin | .......................... | 280/47.38 |
| 4,685,688 A * | 8/1987 | Edwards | ......................... | 280/30 |
| 4,706,986 A * | 11/1987 | Kassai | .......................... | 280/642 |
| 4,729,572 A * | 3/1988 | Bergeron | .................... | 280/47.4 |
| 4,732,406 A * | 3/1988 | Kassai | .......................... | 280/642 |
| 4,736,960 A * | 4/1988 | Batty et al. | ...................... | 280/42 |
| 4,786,064 A * | 11/1988 | Baghdasarian | ................ | 280/30 |
| 4,822,064 A * | 4/1989 | Hunter | ............................. | 280/30 |
| 5,611,560 A * | 3/1997 | Thimmig | ...................... | 280/642 |
| 5,653,460 A * | 8/1997 | Fogarty | ........................ | 280/642 |
| 5,722,682 A * | 3/1998 | Wang | ........................... | 280/642 |
| 6,267,406 B1 * | 7/2001 | Huang | .......................... | 280/647 |
| 6,648,343 B2 * | 11/2003 | Way et al. | .................... | 280/5.22 |
| 6,752,405 B1 * | 6/2004 | Wright | ....................... | 280/47.38 |
| 6,918,608 B2 * | 7/2005 | Crisp | ............................. | 280/642 |
| 6,981,709 B2 * | 1/2006 | Saint | ........................... | 280/47.38 |
| 7,017,938 B2 * | 3/2006 | Kinzel | .......................... | 280/650 |
| 7,516,966 B2 * | 4/2009 | Gray | ........................... | 280/47.38 |
| 7,883,104 B2 * | 2/2011 | Driessen | ...................... | 280/650 |
| 8,186,705 B2 * | 5/2012 | Greger et al. | ................. | 280/643 |

* cited by examiner

*Primary Examiner* — J. Allen Shriver, II
*Assistant Examiner* — Bridget Avery
(74) *Attorney, Agent, or Firm* — Convergent Law Group LLP

(57) ABSTRACT

A transporter for an infant comprising first and second means to receive an infant in the transporter, the means moveable between a first, closed orientation unsuitable for receiving an infant, and a second, open orientation for receiving an infant. The transporter further comprises first and second wheels disposed respectively at first and second ends of the transporter, the second wheel movable between a first operative position providing for a first wheel base and a second operative position providing for a second wheel base, wherein the first wheelbase is different from said second wheelbase, and wherein the second means is movable between the first and second orientations responsive to movement of the second wheel between the first and second operative positions.

21 Claims, 7 Drawing Sheets

TRANSPORTER

CROSS-REFERENCE TO RELATED APPLICATIONS

This application claims benefit of foreign priority under 35 U.S.C. §119 to International Patent Application No. PCT/GB2006/050349, filed on Oct. 24, 2006.

FIELD OF THE INVENTION

This invention relates to transporters, in particular transporters such as pushchairs for infants.

BACKGROUND OF THE INVENTION

Pushchairs for infants are well known, and generally include front and rear wheels connected by a chassis to handles and supporting a seat for an infant. The front and rear wheels define a wheel base for the pushchair, rest on the ground while the pushchair is in use, and are used to move the pushchair. Such pushchairs tend to be of a size to easily accommodate a small child or infant, and are used to transport the infant conveniently from place to place. Such pushchairs have the further advantage that they easily fit into shop doorways, along supermarket aisles, narrow passageways, and streets and can often be folded or collapsed and stored in houses, car boots or like places without taking up too much space.

It is often necessary to transport two or sometimes even three small children, and pushchairs can be adapted to accommodate such numbers, but have the disadvantage that they are then rather large and are no longer as easy to manoeuvre or store. In addition, it is often necessary to transport children of different ages, one of whom will want to walk at least some of the time, so that it becomes necessary to manoeuvre a large pushchair while also supervising a small child.

Some pushchairs have a small bar at the rear, adjacent the rear wheels, upon which a small child may stand, such that the child is sandwiched between the pushchair body in which an infant is being carried and a carrier holding the pushchair handles. This arrangement has several disadvantages. One disadvantage is that the arrangement is not suitable for very small, or very tired young children, as they would generally prefer to sit, also it is easy for such a child to jump off, and so extra vigilance must be exercised by the carrier to assure the child's safety. Further, the child unbalances the pushchair, placing extra weight on the rear wheels, and the carrier may have to support the pushchair and/or balance it when the child is standing on the bar.

BRIEF SUMMARY

The present arrangement provides a pushchair for an infant which can carry one or more infants, which is compact, does not become unbalanced when occupied by more than one child, and which is easy to move between an arrangement for supporting or carrying one child and an arrangement for supporting or carrying more than one child.

According to one aspect of the present invention there is provided a transporter for an infant comprising first means to receive an infant in the transporter, second means to receive an infant in the transporter, the second means moveable between a first, closed orientation unsuitable for receiving an infant, and a second open orientation suitable for receiving an infant. A first wheel is disposed at a first end of the transporter, and a second wheel disposed at a second end of the transporter, the second wheel movable between a first operative position providing for a first wheel base, and a second operative position providing for a second wheelbase, the first wheelbase being different from the second wheelbase. The second means is movable between the first and second orientations responsive to movement of the second wheel between the first and second operative positions.

Preferably the wheelbase of the pushchair with the second wheel in the first operative position is in the same plane as the wheelbase of the pushchair with the second wheel in the second operative position.

According to a further aspect of the invention the second wheel couples to the transporter via a coupling mechanism, the coupling mechanism being in a closed orientation when the second wheel is in a first operative position and the second means is in a closed orientation, and the coupling mechanism being in an open orientation when the second wheel is in a second operative position and the second means is in an open orientation.

According to a still further aspect of the invention the coupling mechanism comprises a bridging bar pivotally connected at one end to a rear spine of the transporter, a radial leg pivotally connected at one end to the bridging bar, remotely from the pivotal connection, and engaged at the second end with the second wheel, and a connecting bar pivotally connected at one end to the radial leg, and pivotally connected to the rear spine, the connecting bar including an intermediate hinge.

According to a still further aspect of the invention the second end of the bridging bar is shaped to form a seat for a child or infant.

According to a first embodiment the coupling mechanism further comprises a fixing bar, pivotally attached to the connecting bar and the pivotal attachment of the bridging bar and radial leg.

According to a second embodiment the coupling mechanism further comprises a fixing bar, pivotally attached to the radial leg and to the pivotal attachment of the rear spine and the connecting bar. The fixing bar may extend outwards from the pivotal attachment to the radial leg and may provide a mounting for a back and sides of the seat.

BRIEF DESCRIPTION OF SEVERAL VIEWS OF THE DRAWINGS

A preferred arrangement of the invention will now be described by way of example only and with reference to the accompanying drawings in which.

A first embodiment of the present invention will now be described with reference to FIGS. 1-3.

DETAILED DESCRIPTION

Figure 1A:
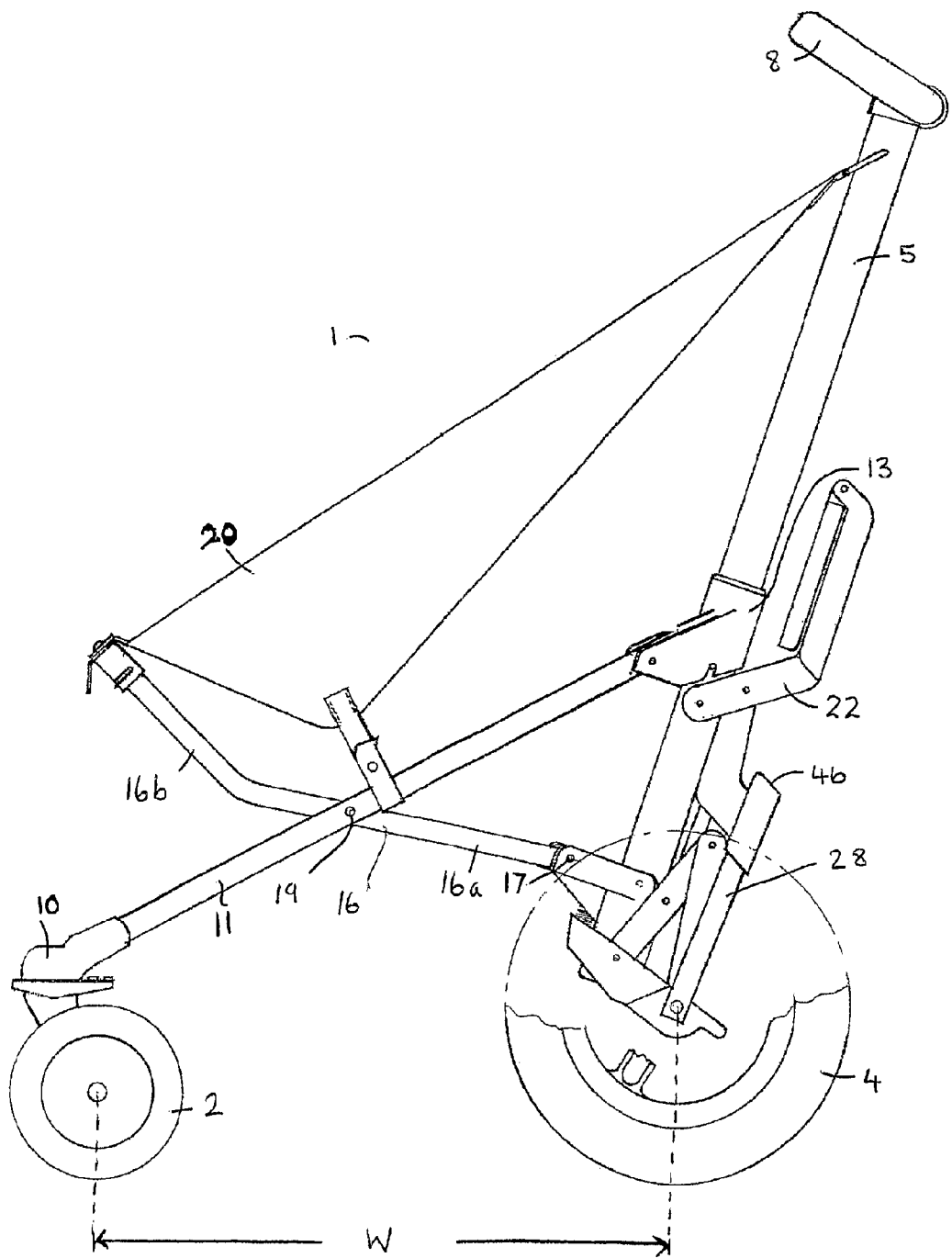
FIG. 1(a) is a side view of a transporter in a first operative position, according to a first embodiment of the present invention.
Figure 1:
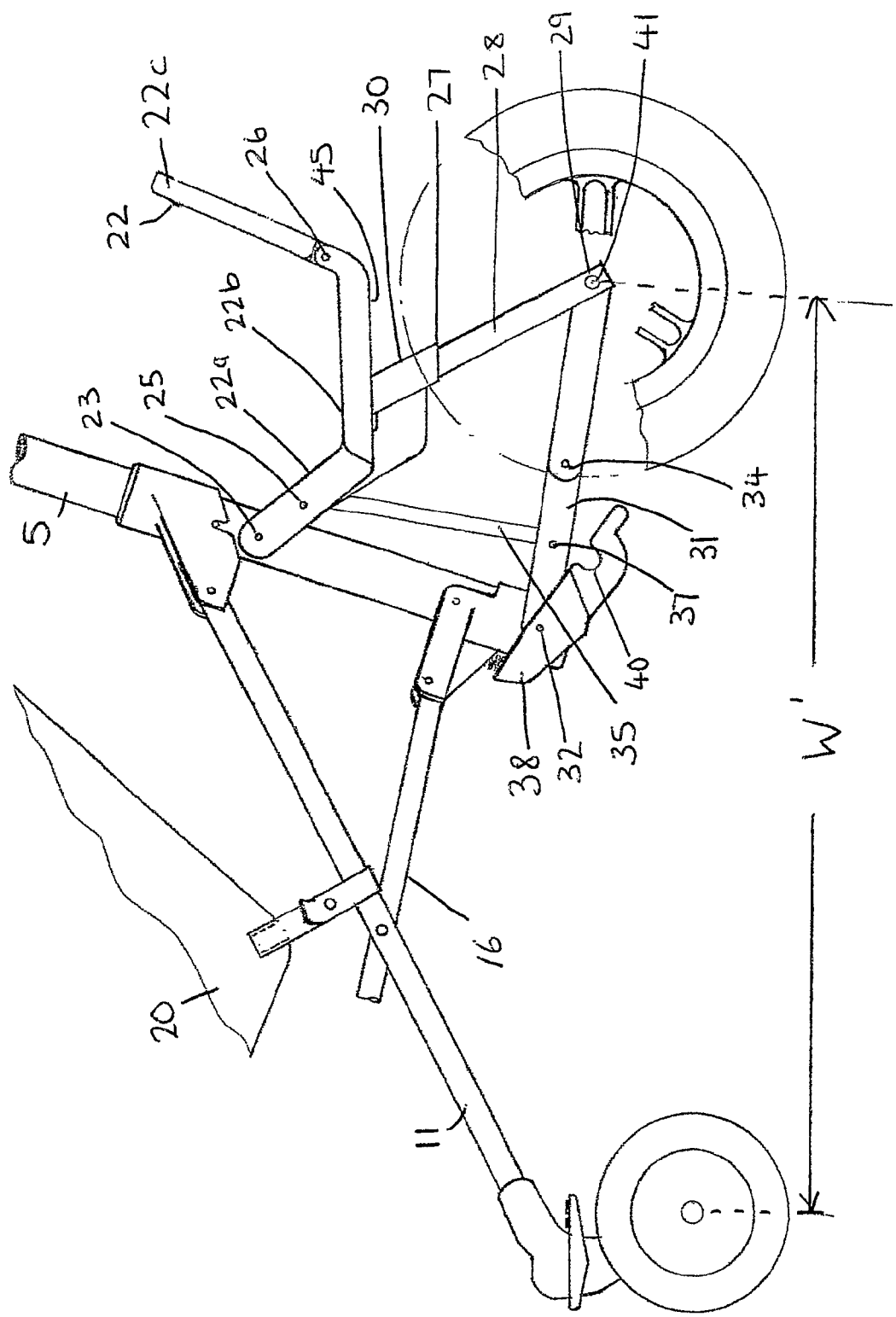
FIG. 1(b) is a side view a portion of the transporter of FIG. 1(a) in a second operative position, showing the second means to receive an infant.

Referring now to FIG. 1(a) there is disclosed a transporter such as a pushchair 1, comprising a pair of front wheels 2 and a pair of rear wheels 4 with a wheelbase W, and a single generally upstanding column or spine 5 coupled to the rear wheels 4 at one end and to a bar with handles 8 at the other. The coupling mechanism linking the rear wheels 4 with the spine 5 are shown in a folded configuration in Figure Iea), comprising the first operative position of the pushchair. This coupling mechanism will be described in more detail in FIG. 1(b), in relation to the open configuration corresponding to the second operative position of the pushchair.

Each front wheel 2 is coupled via a swivellable wheel assembly 10 and an inclined support leg 11 to the spine 5. The wheel assemblies 10 permit the wheels 2 to be steered. Each support leg 11 is slidably and pivotably coupled to the spine 5 via a slider assembly 13 being fixed in position on the spine when the pushchair is in use, and sliding up and down the spine 5, when the pushchair is being moved between an unfolded, usable position and a folded, storage position.

Below the slider assembly 13 on the spine 5 there are two elongate cranked support arms 16 pivotably coupled at one end to the spine 5 via a pivot joint 17. Each support arm 16 extends substantially horizontally in a first part 16a and is pivotably attached via a pivot point 19 to one of support legs 11 before inclining upwards at second part 16b to support a seat 20. The seat 20 is also supported by each leg 11 and by the spine 5.

As can be seen most clearly in FIG. 1(b), the coupling mechanism comprises a bridging bar 22 pivotally coupled, at a pivot point 23, to the rear spine 5 at one end, and pivotally attached, at pivot point 25 slightly offset from the pivot point 23 of the bridging bar 22 with the spine 5, to a wishbone 27 including a pair of radial legs 28. The wishbone 27 further includes an upper portion 30 linking the radial legs 28, the radial legs 28 and upper portion 30 together forming a unitary body, which may be wishbone-shaped, or may be joined together by axle 48, as shown in FIG. 2. In the closed configuration of FIG. 1(a) each radial leg 28 lies substantially parallel to the spine 5, and in the open configuration of FIG. 1(b) each radial leg 28 extends downwardly and away from the spine 5, both legs being coupled to the rear wheels 4 at the end remote from the spine. The upper portion 30 of the wishbone includes an upper surface 46, shown in FIG. 1(a).

The coupling mechanism further comprises a connecting bar 31, pivotally attached to the radial leg 28 at pivot point 29 at one end and pivotally connected to the spine 5 at the other end at pivot point 32, the connecting bar further including a hinge 34 intermediate its two ends.

The coupling mechanism further comprises a fixing bar 35 pivotally attached to the connecting bar 31 at pivot point 37 at one end and pivotally connected to the bridging bar 22 at its other end, preferably at the pivot point 25 of the bridging bar and the radial leg.

The bridging bar 22 has a narrow portion 22a adjacent the spine 5 which extends beyond the pivot point 25 of the bridging bar with the radial leg and fixing bar, and expands to a shape suitable for providing a seat for a child or infant. The seat portion of the bridging bar comprises two portions, a first portion 22b which is adapted to receive the child's weight and a second portion 22c, which is pivotable, about a pivot point 26, between a folded, stored position when portion 22c lies parallel to the seat 22b, usually adopted when the coupling mechanism is in the closed folded orientation of FIG. 1(a), and the open, unfolded orientation of FIG. 1(b) where it forms a back-rest for the occupant of the seat 22b, and may be locked in place by conventional means. The seat portion 22b includes a lower surface 45 which abuts the upper surface 46 of the upper portion of the wishbone 30.

Towards the base of the spine 5 is provided a lock 38 comprising a finger, pivotally attached to the spine at pivot point 32 of the connecting bar and spine and including a locking feature 40 which engages with a corresponding feature 41 adjacent the wheel when the wheel is in its first operative position, to lock the coupling mechanism in its closed configuration. The finger can be disengaged from this locked position when it is desired to move the wheel into its second operative position and unfold the coupling mechanism, and is retained adjacent the spine until needed again.

FIG. 1(a) shows the rear wheel in a first operative position with the rear coupling mechanism closed, the rear wheel adjacent the spine 5, and the second seat 22 in an orientation unsuitable for receiving or carrying an infant or small child. FIG. 1(b) shows the rear wheel in a second operative position, with the coupling mechanism open, the rear wheel at a distance from the spine 5, and the second seat 22 in an orientation suitable for receiving and carrying an infant or small child.

Figure 2:
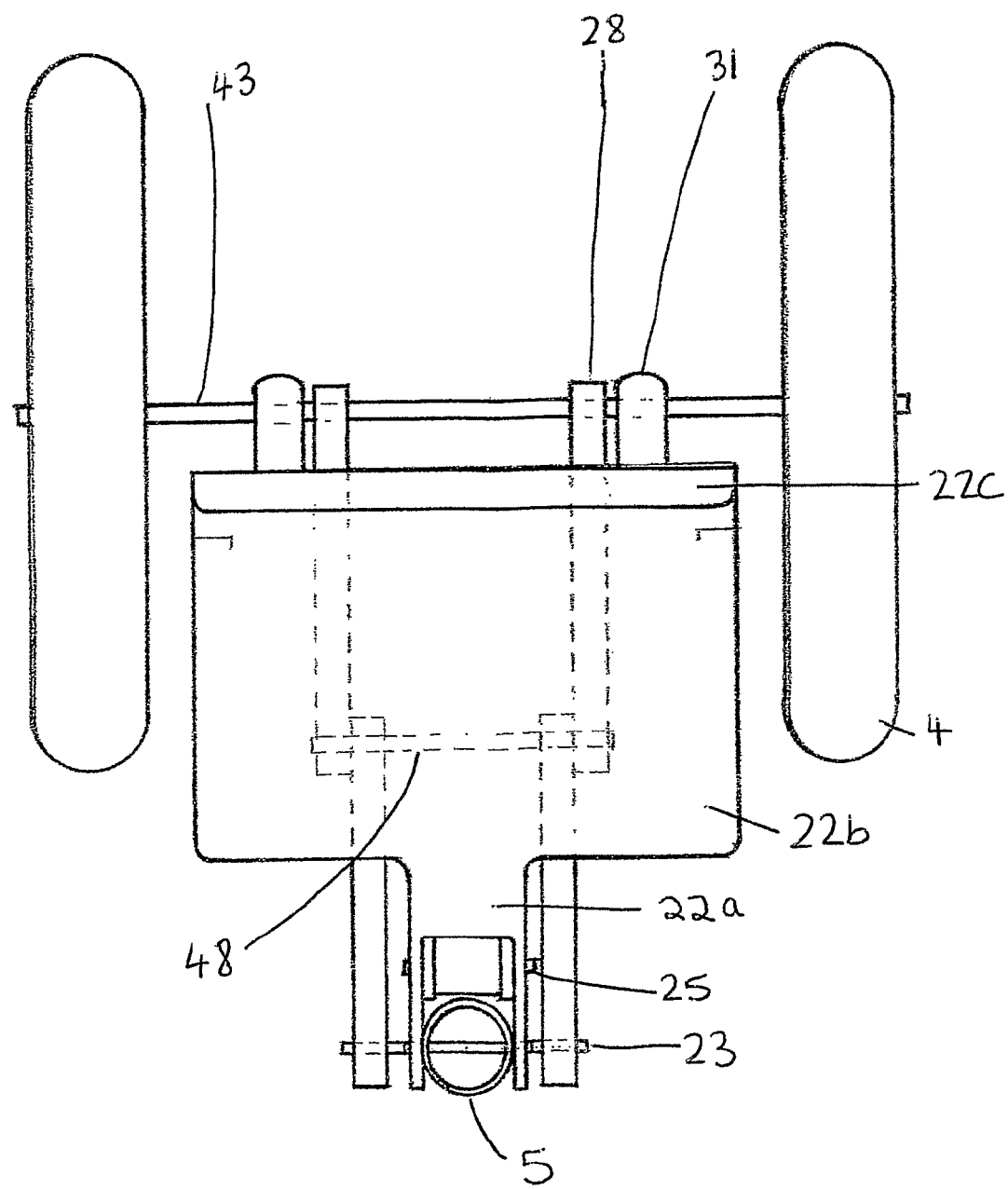
FIG. 2 is a top cross-sectional view of a rear portion of the transporter of FIG. 1(b)

FIG. 2 shows a partial top view of the bridging bar seat 22b of the present arrangement, including the axle 43 connecting the two rear wheels 4, a partial view of the connecting bar 31, a partially dashed view of the wishbone 27 and radial legs 28.

Figure 3:
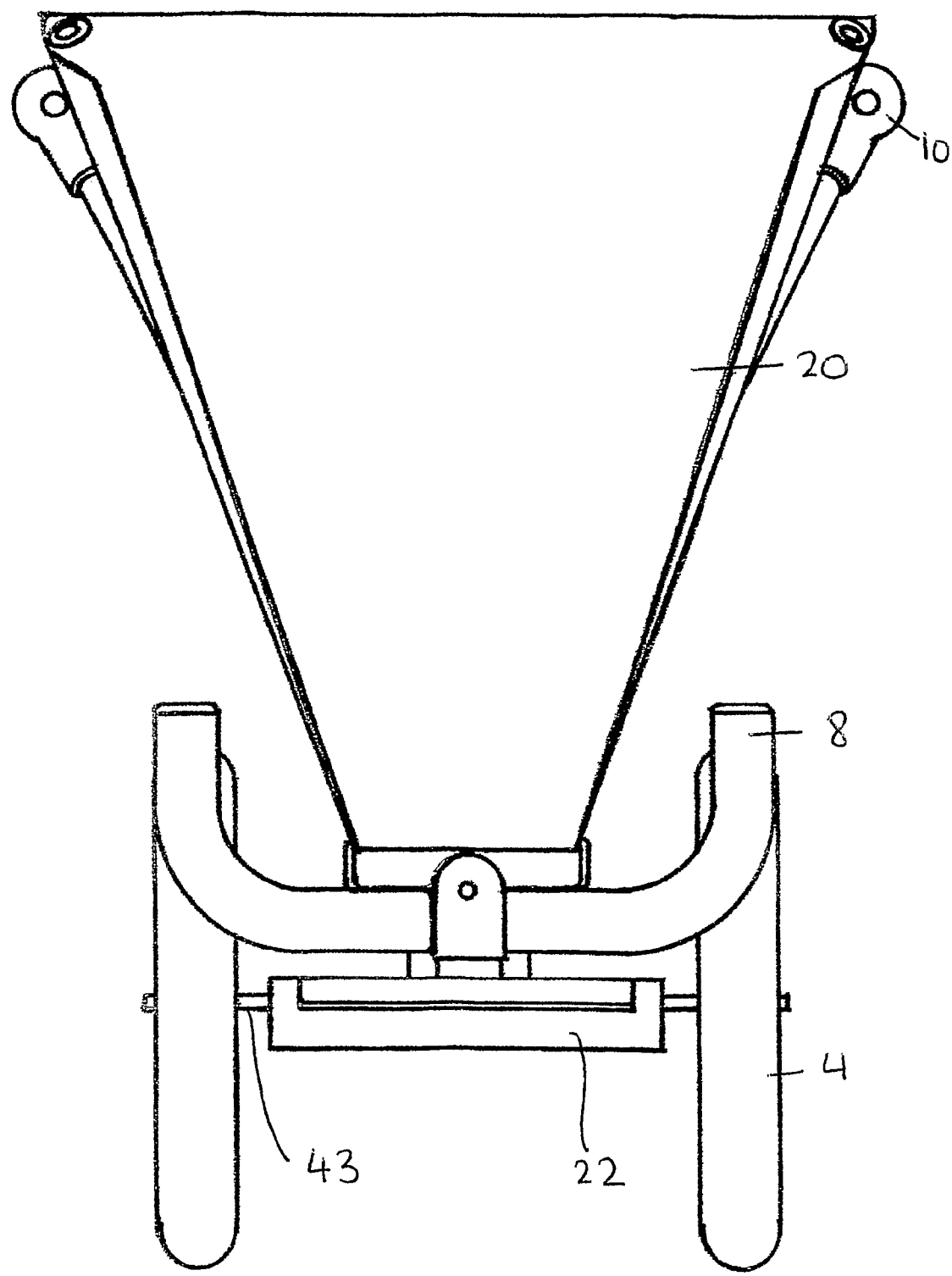
FIG. 3 is a top view of the transporter of FIG. 1(a)

FIG. 3 shows a top view of a pushchair including the coupling mechanism of the present invention with the bridging bar 22 in a folded configuration adjacent rear spine 5.

The rear wheel is attached to the coupling mechanism by conventional means.

A second embodiment of the present invention will now be described with reference to FIGS. 4-6.

Figure 4:
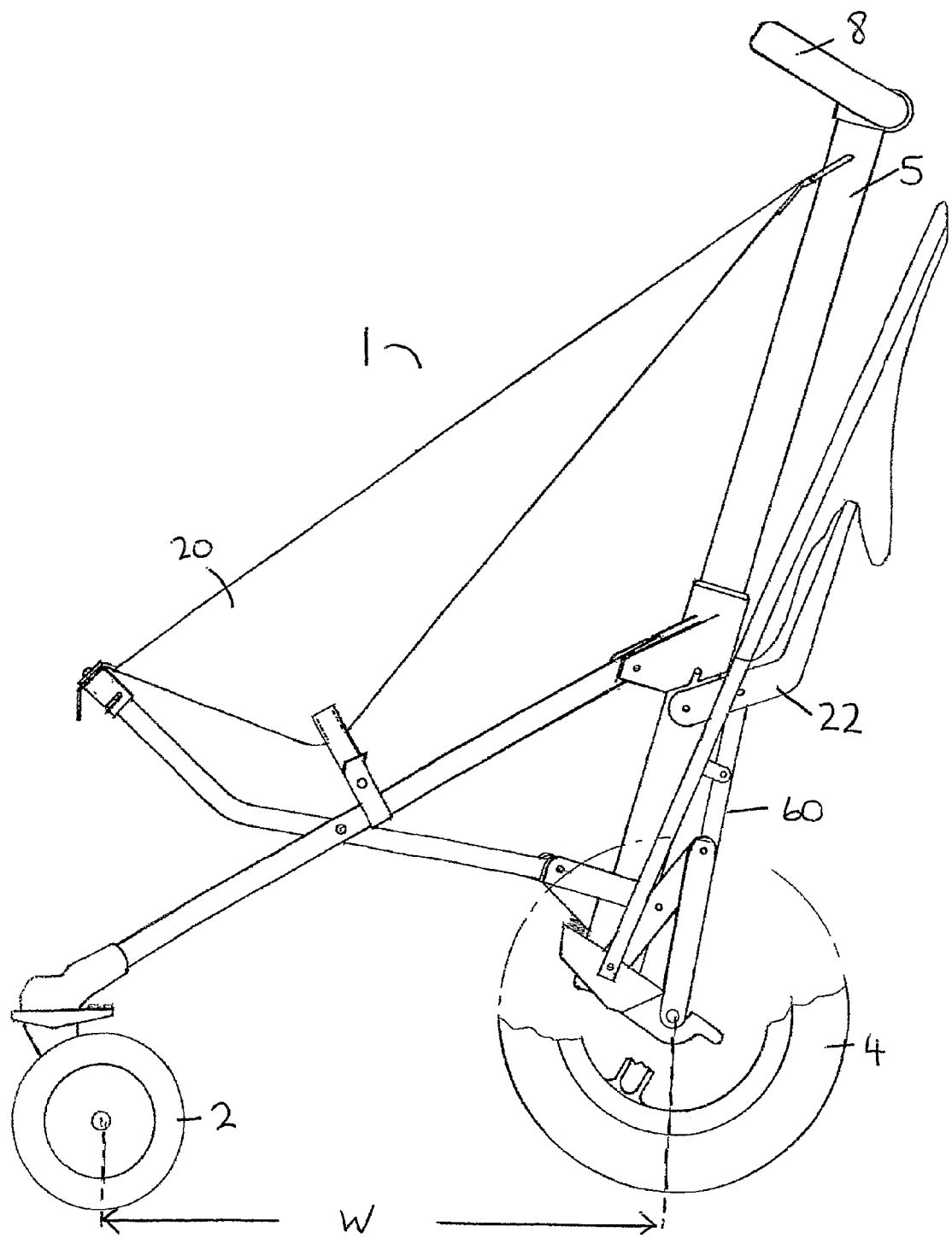
FIG. 4 is a side view of a transporter in a first operative position according to a second embodiment of the present invention.

Referring now to FIG. 4 there is disclosed, as with the first embodiment, a transporter such as a pushchair 1, comprising a pair of front wheels 2 and a pair of rear wheels 4 providing for a wheelbase W, a single generally upstanding column or spine 5 coupled to the rear wheels 4 at one end and to a bar with handles 8 at the other, and a first seat 20. The coupling mechanism linking the rear wheels 4 with the spine 5 are shown in a folded configuration in FIG. 4, comprising the first operative position of the pushchair. This coupling mechanism will be described in more detail in relation to FIG. 5, which describes the open configuration corresponding to the second operative position of the pushchair.

Each front wheel is coupled to the spine conventionally, or as disclosed in relation to the first embodiment.

FIG. 4 shows the rear wheel in a first operative position with the rear coupling mechanism closed, the rear wheel adjacent the spine 5, and the second seat 22 in a closed orientation unsuitable for receiving or carrying an infant or small child. FIG. 5 shows the rear wheel in a second operative position, with the coupling mechanism open, the rear wheel at a distance from the spine 5 and the second seat in an open orientation suitable for receiving and carrying an infant or small child.

The rear wheel is attached to the coupling mechanism by conventional means.

Figure 5:
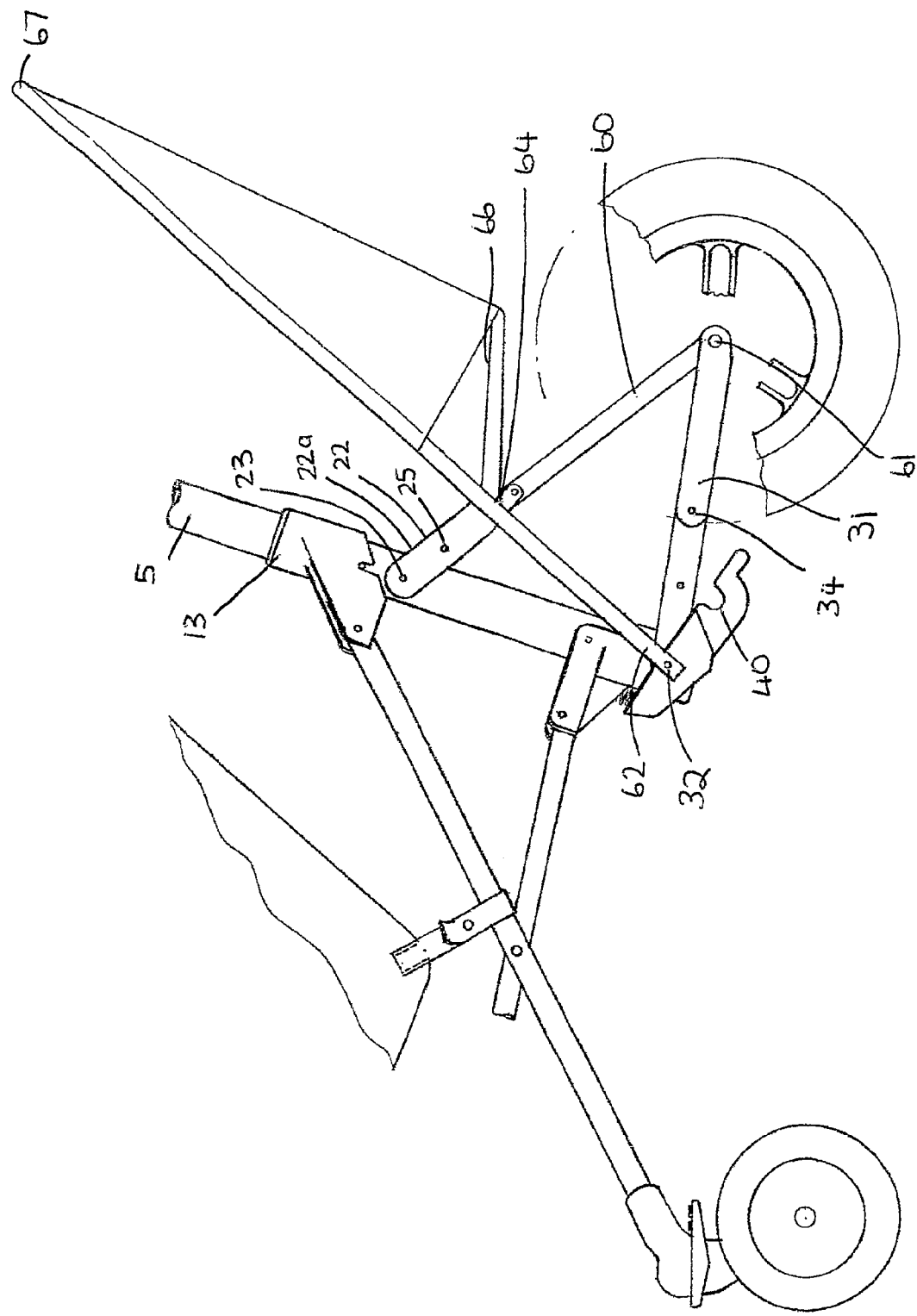
FIG. 5 is a side view of the transporter of FIG. 4 in a second operative position, showing the second means to receive an infant.
Figure 6:
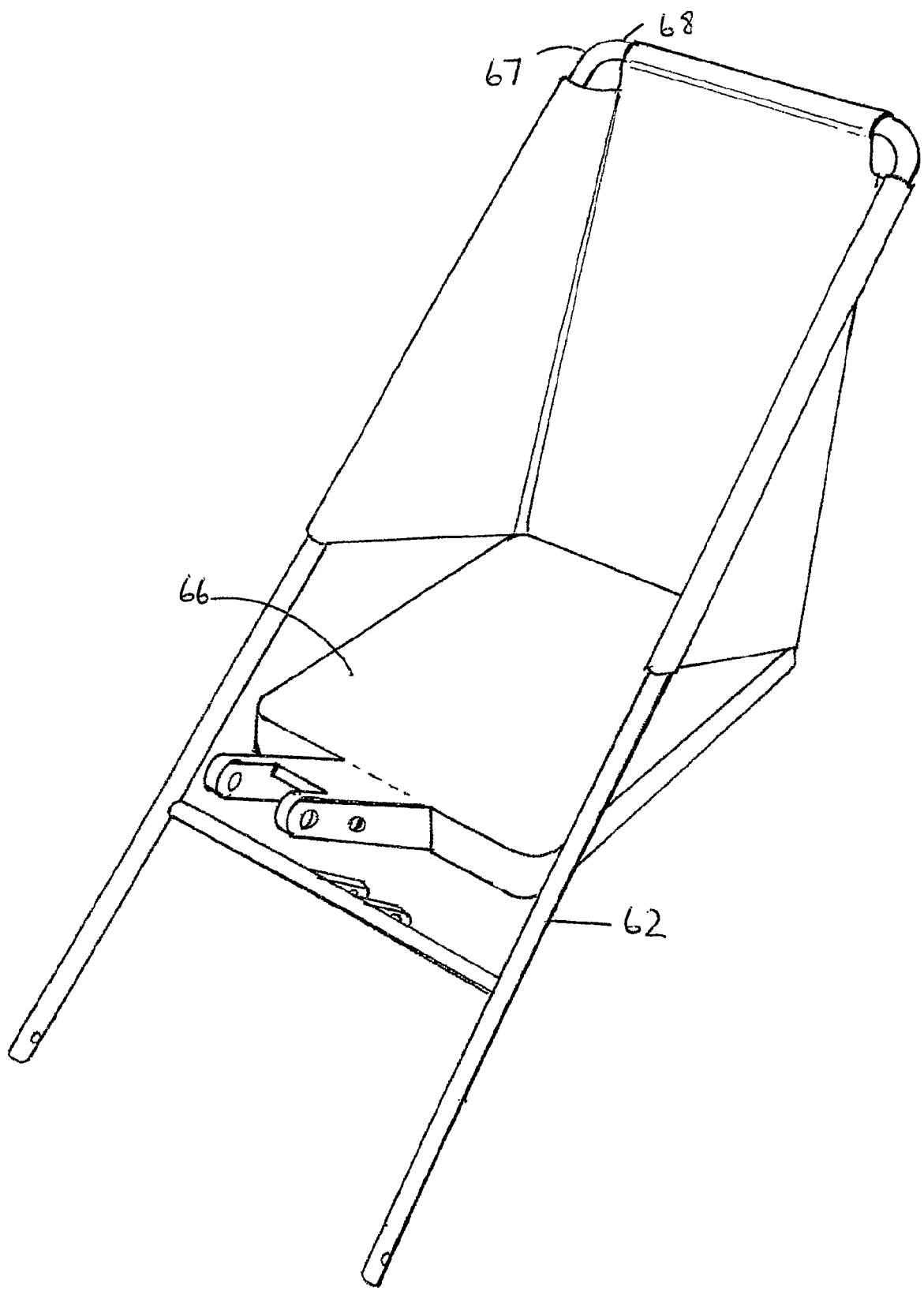
FIG. 6 shows a detail of the second means to receive an infant according to the second embodiment.

As can be seen most clearly in FIG. 5 the coupling mechanism comprises a bridging bar 22 with two ends, the bar 22 pivotally coupled, at a pivot point 23, to the rear spine 5 at one of the two ends. The bridging bar also has two sides, a first side adjacent a first side of the buggy and a second side adjacent a second side of the buggy. The bridging bar is pivotally attached, at pivot point 25 slightly offset from the pivot point 23 of the bridging bar 22 with the spine 5, and at a first side, to a first end of a first radial leg 60 and at a second side to a first end of a second radial leg 60, the second ends of the respective radial legs coupling to respective rear wheels 4. In the closed configuration of FIG. 4 each radial leg is broadly in alignment with the spine 5, and in the open configuration of FIG. 5 each radial leg 60 extends downwardly and away from the spine 5.

FIG. 5 further shows the coupling mechanism including a connecting bar 31, pivotally attached to the radial leg 60 at pivot point 61 at one end and pivotally connected to the spine 5 at the other end at pivot point 32, the connecting bar further including a hinge 34 intermediate its two ends. In addition the coupling mechanism includes a fixing bar 62 pivotally attached to the rear spine and connecting bar 31 at pivot point 32 at one end and also pivotally connected to radial leg 60, at pivot point 64, at some point along its length.

The bridging bar 22 has a narrow portion 22a adjacent the spine 5 which extends beyond the pivot point 25 of the bridging bar 22 with the radial leg 60 and expands to a shape suitable for providing a seat 66 for a child or infant. Each side of the pushchair has a respective fixing bar 62, and each fixing bar 62 extends beyond the pivot point 64 at which it engages with a respective radial leg 60, and also extends beyond the seat 66. The end of each fixing bar 67 remote from the pivot point 32 curves over to form a linking bar 68 joining the two fixing bars 62 together.

The two fixing bars 62 and the linking bar 68 provide a frame for mounting a back and sides for the seat. The back and sides may comprise a material such as a fabric material or may be a plastics material. The material engages with the bars 62, 68 and the seat 66 to partially envelop an occupant and retain the occupant in the seat. The material of the back and sides is preferably flexible enough to adopt a closed or crumpled configuration when the second means is in a closed orientation, and can expand out to form a back and sides for the seat when the second means is the open configuration.

As in the first embodiment, in the second embodiment the second means may be locked in the closed orientation with the second wheel in the first operational position adjacent the spine 5 by means of a lock 38 positioned towards the base of the spine 5, and further by means of locking features 40 and 41 adjacent the wheel, when the wheel is in its first operative position, or by other conventional means.

The arrangement of the coupling mechanism in any embodiment is such that the wheelbase W of the pushchair with the second wheel in the first operative position is different from the wheelbase W' of the pushchair with the second wheel in the second operative position. Preferably the wheelbase W of the pushchair with the second wheel in the first operative position is in the same plane as the wheelbase W' of the pushchair with the second wheel in the second operative position.

In a preferred embodiment, the arrangement of the coupling mechanism is such that with the second means to receive an infant in a closed orientation, and the coupling mechanism closed, the wheelbase W is smaller than the wheelbase W' when the second means to receive an infant is in an open configuration and the coupling mechanism open. Therefore the transporter is more compact with only one infant or small child in the pushchair and has a small wheel base W, and the pushchair is less compact with two infants or small children in the pushchair, and the larger wheelbase W' provided for carrying two infants renders the pushchair stable.

In particular, in use, with the rear wheels in a first operative position and the coupling mechanism closed, the pushchair is adapted to support or carry a child or infant in a seat 20. In this first operative position the first and second, or front and rear wheels of the pushchair provide for a wheelbase W shown in FIGS. 1(a) and 4. The handles 8 of the pushchair are positioned at a suitable height for a carrier to push the pushchair and the weight of the pushchair plus any occupant is distributed in a balanced and stable manner over the wheelbase W.

To retain the coupling mechanism securely in this orientation the locking finger 38 engages with the corresponding feature 41 adjacent rear wheels 4. In the embodiment of FIGS. 1(a) and 1(b) the locking feature 40 comprises an opening which hooks over a pin 41 (not shown) adjacent the wheel 4.

According to the first embodiment, when it is desired to access the rear seat 22b, the opening 40 may be unhooked from the pin 41 and the connecting bar 31 unfolded via the hinge 34 until the connecting bar is substantially straight. While the connecting bar is unfolding, the fixing bar 35 urges the bridging bar 22 to rotate in a clockwise direction around its pivot point 23 with the spine 5 while radial leg 28, together with the wishbone 27, rotates in an anticlockwise direction about its pivot point 25 with the bridging bar and fixing bar, and rear wheels 4 move from the first operative position to the second operative position.

A base 45 of the rear seat 22b of the rotated bridging bar abuts the upper surface 46 of the upper portion 30 of the wishbone 27 and is thereby supported and retained in position. The backrest 22c is then rotated about pivot point 26 until it locks in a conventional manner in its open position shown in FIG. 1(b). The locking arm is retained on the spine 5.

In a preferred arrangement the present invention provides for the wheels 4 to roll between the first and second operative positions in a direction parallel to the plane of the wheel base W of the first position, so that the weight of the pushchair is supported at all times, i.e. when the wheels are in each operative position and also when moving between the operative positions. This has the advantage that a carrier will at no time be required to take the weight of the pushchair and any contents when moving between positions. A further advantage is that movement between the two positions will not place undue force on any component of the pushchair, its wheels or coupling mechanism, leading to a longer life for such components and to a smooth and easy transition between positions.

This is achieved most particularly by the wheelbase W' of the second operative position being different from the wheelbase W in the first operative position, but remaining in the same plane. However, it is contemplated that the wheelbase of the pushchair when the pushchair is in either operative position may not be in the same plane.

Advantageously, the wheelbase in the second operative position is larger, such that when the transporter has two seats available for occupation the transporter with a larger wheelbase is more stable. With the wheel base in the first operative position the transporter has only one seat available for occupation, and the wheelbase is smaller, making the transporter easier to manoeuvre.

According to the first embodiment, in the first operative position the backrest 22b of the bridging bar seat is best stored in a folded orientation, lying adjacent the seat portion 22a of the bridging bar, with the seat portion 22a of the bridging bar itself adjacent the spine 5 of the pushchair 1. The radial leg 28 also lies adjacent the spine 5 and the connecting bar 31 is folded at the hinge 34 to provide for the rear wheel 4 to be positioned substantially adjacent the spine 5.

According to the second embodiment, in the first operative position the seat portion 66 of the bridging bar 22 is positioned adjacent spine 5 of the pushchair 1. Radial leg 60 is also positioned adjacent the spine 5 and the connecting bar 31 is folded at the hinge 34 to provide for the rear wheel 4 to be positioned substantially adjacent the spine 5. The coupling mechanism is retained securely in this fashion by the locking mechanism in accordance with the disclosures of the first embodiment.

According to the second embodiment, when it is desired to access the rear seat 22b, the opening 40 may be unhooked from pin 41 and the connecting bar 31 unfolded via the hinge 34 until the connecting bar 31 is substantially straight. While the connecting bar unfolds, the radial leg 60 urges the bridging bar 22 to rotate in a clockwise direction about pivot point 25 and also pivot point 23, while the radial leg rotates, relative to the bridging bar, in an anticlockwise direction, until the first portion of bridging bar 22a and radial leg 60 are substantially parallel.

The bridging bar 22a includes a shelf, 71, which abuts the radial leg 60, preferably when the radial leg 60 and the bridging bar 22 are substantially parallel, providing a stop to further rotation. The seat end 66 of the bridging bar then provides for a seat to receive an infant or small child. Concurrently, the fixing bar 62 rotates in a clockwise direction about pivot point 32, responsive to the action of the radial leg 60.

As the fixing bar 62 rotates the material 70 unfolds or otherwise unwraps to form the back and sides of the seat. A small child or infant may therefore be received into the seat and retained without fear of falling backwards or sideways off the seat.

As discussed, with the second wheel in the second, open orientation, and the second receiving means in the second, open orientation, the wheel base W' is larger than the wheel base W with the second wheel and second receiving means in the closed orientation, providing for a more stable transporter.

Preferably throughout this procedure the wheels roll along the surface between operative positions, and the wheelbase in either of the operative positions of the rear wheels, and at any intermediate point in the transition between the two, remains in the same plane. Therefore in a preferred embodiment no part of the procedure requires any lifting or lowering of the height of the pushchair to permit the procedure steps to continue.

A child may then be placed on the seat of the second receiving means, the legs of the child accommodated comfortably by the narrow portion 22a of the bridging bar 22 in the first embodiment, a child held more securely by the back and sides of the second embodiment.

The invention is not restricted to the details of the foregoing embodiment.

In particular, the coupling mechanism is suitable for use with any type of pushchair or transporter, and is not limited to the folding or collapsible pushchair described. When used with other types of pushchair the connection between the seat 20 and the spine 5 may be fixed rather than slidable, the attachment of the seats 20, 22b, 66, to the spine 5 may be different, without the pivotal arrangements of the present invention. In addition, in this or other types of pushchair, the spine may not be a single rear column but may include more than one upwardly extending member attaching the seat, handles and wheels. Front wheels 2 may be castor wheels or other conventional wheel arrangement.

In respect of the coupling mechanism of the present invention, the fixing bar may be a resilient fixing means, or other means may be adopted to fix the connecting bar in position. The hinge of the connecting bar may be adapted to prevent downward bending of the bar when the connecting bar is straight, and the connecting bar may not be required to be straight in the second operative position, but may merely be arranged to fix the coupling mechanism in the second operative position.

The position of the seat 22b may be secured, while in use, by means other than engaging with the radial leg 28, for example the seat may be coupled to the spine such that it can move between a folded and an open position, the open position being suitable for using the seat and in which the seat can safely and securely receive the weight of a child or toddler. The seat back 22c may be attached to the seat base 22b by means other than pivotal means, such as any conventional fixing means. The bridging bar may not be shaped to form a seat, but may provide a receptacle for shopping, or may be placed differently on the coupling mechanism, for example to form a platform on which a child might stand.

The coupling mechanism may be locked in the closed position by means other than the cooperating locking means 40 and 41, any conventional locking mechanism will be suitable, and the locking means may be provided in any arrangement between the spine 5 and adjacent rear wheels 4, and retained thereon.

Means may be provided on the coupling mechanism for a user to move the coupling mechanism between positions, such as a footplate or handle on the coupling mechanism.

In all cases, the bridging bar, the fixing bar, and the radial leg of the coupling mechanism may be stored, when the coupling mechanism is in the closed configuration, in a position that is substantially parallel with spine 5, or may be stored in a position that is not parallel with, or even adjacent, spine 5.

While the transporter has been discussed in relation to the first receiving means towards a front end of the transporter and the second receiving means, behind the first receiving means, are nearer the transporter handles, it is contemplated that the second receiving means may be in front of the first receiving means and further from the handles, or otherwise disposed.

The wheels of the pushchair according to the present invention may comprise a single front wheel, or multiple front wheels, and/or a single rear wheel or multiple rear wheels, and the configuration of the front and rear wheels may be conventional and vary from the arrangement shown.

In addition, the pushchair is disclosed in relation to infants or small children, but it is contemplated that the pushchair may accommodate an older, disabled child.

The invention claimed is:

1. A transporter for an infant comprising:
   first means to receive an infant in the transporter;
   second means to receive an infant in the transporter, said second means moveable between a first, closed orientation unsuitable for receiving an infant, and a second, open orientation for receiving the infant;
   a first wheel disposed at a first end of the transporter;
   a second wheel disposed at a second end of the transporter, said second wheel movable between a first operative position providing for a first wheel base and a second operative position providing for a second wheel base, wherein said first wheelbase is different from said second wheelbase,
   wherein, with said first means in a position capable of receiving an infant, said second means is pivotally movable between said first and second orientations responsive to movement of said second wheel between said first and second operative positions,
   wherein said second wheel couples to the transporter via a coupling mechanism, the coupling mechanism being in a closed orientation when said second wheel is in a first operative position and said second means is in a closed orientation, and the coupling mechanism being in an open orientation when the second wheel is in a second operative position and the second means is in an open orientation, and wherein the coupling mechanism comprises:
a bridging bar with two ends, the first end being pivotally connected to a rear spine of said transporter,
a radial leg with two ends, the first end being pivotally connected to said bridging bar remotely from said pivotal connection with said rear spine, the second end engaging with said second wheel,
a connecting bar with two ends, the first end being pivotally connected to the second end of said radial leg, the second end being pivotally connected to said rear spine, said connecting bar including a hinge intermediate said two ends.

2. A transporter as claimed in claim 1, wherein the wheelbase of said first operative position is in the same plane as the wheelbase of said second operative position.

3. A transporter as claimed in claim 1 wherein said coupling mechanism further comprises a fixing bar with two ends, the first end being pivotally attached to said connecting bar, the second end being pivotally attached to said pivotal attachment of said bridging bar and radial leg.

4. A transporter as claimed in claim 1, wherein the second end of said bridging bar is shaped to form a seat for a child or infant.

5. A transporter as claimed in claim 1 wherein the second end of said bridging bar is shaped to form a receptacle.

6. A transporter as claimed in claim 1 wherein the second end of said bridging bar is shaped and positioned to form a platform on which a child or infant might stand.

7. A transporter as claimed in claim 1 wherein said coupling mechanism further comprises a fixing bar with two ends, said the first end being pivotally attached to said pivotal attachment of said rear spine and said connecting bar, the second end being pivotally attached to said radial leg.

8. A transporter as claimed in claim 1 wherein the coupling mechanism further includes a locking mechanism to lock said coupling mechanism in said closed orientation.

9. A pushchair including the coupling mechanism of claim 1.

10. A transporter as claimed in claim 1 or claim 2 wherein said second means comprises a child seat.

11. A transporter as claimed in claim 3 wherein said fixing bar is attached to said connecting bar at a position intermediate said rear spine and said hinge.

12. A transporter as claimed in claim 4 wherein said seat portion extends upwardly and outwardly away from said bridging bar.

13. A transporter as claimed in claim 4 wherein said seat includes a backrest pivotable between a closed position in which the backrest is substantially parallel to the base of the seat and an open position in which the seat is exposed.

14. A transporter as claimed in claim 12, wherein said radial bar includes a shelf portion such that when the second wheel is in the second orientation, and the coupling mechanism is in an open configuration, the shelf portion abuts the base of the seat, to provide a stop for the seat and to support a weight placed in the seat.

15. A transporter as claimed in claim 6 wherein said platform is positioned on said coupling mechanism in a position suitable for a standing child or infant.

16. A transporter as claimed in claim 7 wherein the second end of said bridging bar is shaped to form a seat for a child or infant.

17. A pushchair including the coupling mechanism of claim 7.

18. A transporter as claimed in claim 16 wherein said fixing bar extends outwardly from said pivotal attachment to said radial leg.

19. A transporter as claimed in claim 18 wherein said extended portion of said fixing bar provides a mounting for a back and sides of said seat.

20. A transporter as claimed in claim 19 wherein said bridging bar includes a shelf portion, said shelf portion abutting said radial leg to provide a stop for said seat when the second means are in the open configuration.

21. A transporter as claimed in claim 8 wherein said locking mechanism comprises a locking arm engageable with said rear spine and said radial leg.

* * * * *